United States Patent
Pita-Gil et al.

(10) Patent No.: US 9,308,823 B2
(45) Date of Patent: Apr. 12, 2016

(54) BRAKING SUPERVISION

(71) Applicant: RENAULT s.a.s., Boulogne-Billancourt (FR)

(72) Inventors: Guillermo Pita-Gil, Montigny-le-Bretonneux (FR); Hamid Azzi, Maurepas (FR); Sofiane Amara, Paris (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 0 days.

(21) Appl. No.: 14/361,855

(22) PCT Filed: Dec. 3, 2012

(86) PCT No.: PCT/EP2012/074259
§ 371 (c)(1),
(2) Date: May 30, 2014

(87) PCT Pub. No.: WO2013/083525
PCT Pub. Date: Jun. 13, 2013

(65) Prior Publication Data
US 2014/0365053 A1    Dec. 11, 2014

(30) Foreign Application Priority Data
Dec. 5, 2011   (FR) ................................. 11 61137

(51) Int. Cl.
| | |
|---|---|
| *B60L 9/00* | (2006.01) |
| *B60L 7/18* | (2006.01) |
| *B60L 7/22* | (2006.01) |
| *B60L 7/26* | (2006.01) |
| *B60T 8/32* | (2006.01) |

(52) U.S. Cl.
CPC ... *B60L 7/18* (2013.01); *B60L 7/22* (2013.01); *B60L 7/26* (2013.01); *B60T 8/3205* (2013.01); *B60L 2240/16* (2013.01); *B60L 2260/42* (2013.01)

(58) Field of Classification Search
CPC .................. B60T 2270/604; B60T 2270/608; B60W 10/08; B60W 10/188
USPC ........................................................... 701/22
See application file for complete search history.

(56) References Cited

U.S. PATENT DOCUMENTS

| | | | |
|---|---|---|---|
| 2003/0184155 | A1 | 10/2003 | Crombez et al. |
| 2008/0129110 | A1 | 6/2008 | Jager et al. |

(Continued)

FOREIGN PATENT DOCUMENTS

DE    10 2005 003 159    8/2006

OTHER PUBLICATIONS

French Search Report Issued Sep. 19, 2012 in French Application No. 1161137 Filed Dec. 5, 2011.

(Continued)

*Primary Examiner* — James Trammell
*Assistant Examiner* — Michael D Lang
(74) *Attorney, Agent, or Firm* — Oblon, McClelland, Maier & Neustadt, L.L.P.

(57) ABSTRACT

A method and control system for a vehicle including a regenerating braking mechanism and a complementary braking mechanism, the method including: receiving at least one vehicle acceleration measurement value, at least one torque value applied by the regenerating braking system, and at least one complementary braking set value for the complementary braking mechanism, wherein the at least one value corresponds to at least one respective measurement moment during a braking transition; and estimating an efficiency coefficient of the complementary braking mechanism from the at least one received value.

9 Claims, 3 Drawing Sheets

(56) References Cited

U.S. PATENT DOCUMENTS

2011/0015906 A1* 1/2011 Bian et al. .................. 703/2
2012/0280562 A1* 11/2012 Wu et al. .................. 303/152

OTHER PUBLICATIONS

International Search Report Issued Jan. 3, 2013 in PCT/EP12/074259 Filed Dec. 3, 2012.

* cited by examiner

BRAKING SUPERVISION

BACKGROUND

The present invention relates to monitoring of braking for a vehicle equipped with a regenerative braking means, for example an electric braking means, and a complementary braking means, for example a hydraulic braking means.

The vehicle can, for example, be an electric or hybrid vehicle.

On a vehicle equipped with at least one electric traction or propulsion motor, it is possible, under certain conditions, to use the electric motor as generator and thus obtain an electric braking means.

Such a use is advantageous because, being regenerative, it makes it possible to recover a portion of the energy in order to recharge the batteries.

Nevertheless, in the case of vehicles thus equipped with an electric actuator allowing for regenerative braking, and a hydraulic actuator of a conventional friction brake, it has been observed that, for a given braking set point (i.e. a user set point, that is to say a given pressure on the brake pedal), the level of deceleration is likely to be different according to the distribution between the hydraulic braking and the electric braking.

Figure 1:
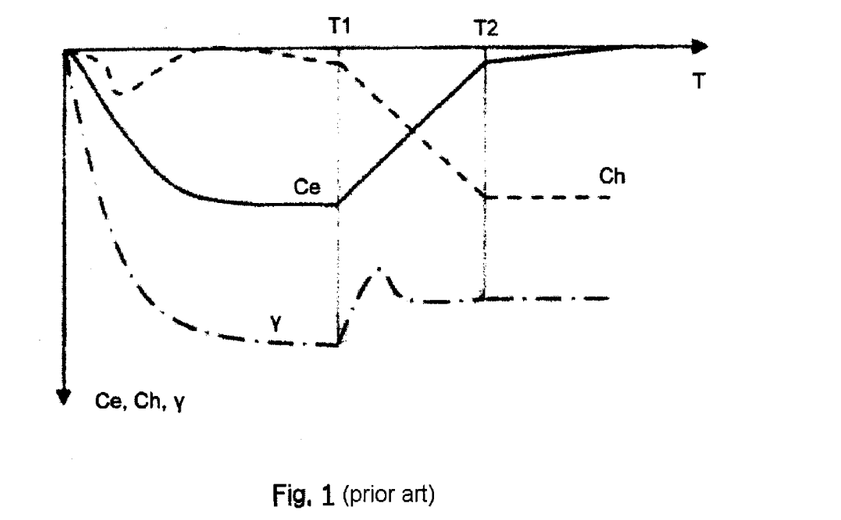

Referring to FIG. 1, there is represented, over a braking sequence or transition, the trend over time of braking torques and of the acceleration of the vehicle with, on the x axis, the time, bearing in mind that the driver applies a constant braking set point such that the vehicle slows down commensurately, and, on the y axis, the electric torque Ce, the hydraulic torque Ch and the resulting acceleration (or deceleration) γ.

As it happens, the system of distribution between electric braking and hydraulic braking is arranged in such a way as to prevent the electric braking below 7 km/h. The cut-off is gradual, between 14 and 7 km/h. The instant T1 corresponds to a threshold of 14 km/h from which the regenerative braking is gradually deactivated, and the instant T2 corresponds to a threshold of 7 km/h.

The chain-dotted curve represents the torque corresponding to the observed deceleration. As can be seen for the instants slightly before T1 for which the braking is almost entirely electric, the torque applied is greater than the torque applied for the instants slightly after T2, for which the braking is almost entirely hydraulic. This gap is due to the imprecision of the efficiency of the hydraulic actuator.

This can be relatively disturbing for the user, in as much as the user can have the sensation that the vehicle is likely to not use the same braking for a given control.

The electric actuator can have precision of the order of 5%, but the efficiency of the hydraulic actuator can vary with time and exhibit deviations of the order of 30 or 40%. The efficiency of the hydraulic actuator is in fact a function in particular of the state of wear of the brake pads and of the temperature.

There is therefore a need for a response of the vehicles to braking that is more predictable and more constant for the user.

The document US 2008/0129110 describes a method for monitoring braking with energy recovery comprising:

a step of measuring the acceleration when the vehicle reaches a certain speed for which this acceleration is assumed to result only from the efficiency of the electric braking means;

a step of measuring the acceleration for another speed of the vehicle, this other speed being such that the acceleration is assumed to result only from the efficiency of the hydraulic braking means, these two measurements being taken for one and the same braking set point value applied by the driver, a step of calculating the ratio of the braking efficiencies, by establishing the ratio of the measured accelerations, a step of applying the ratio of the braking efficiencies to the hydraulic braking control.

This method is then repeated until there is convergence to a gap reduced to zero.

The measurements conditions are difficult to obtain, and the convergence is relatively slow. Furthermore, there is a great dependency on the measurement conditions. In particular, the measurement is segmented over speed ranges, which is detrimental to the generality of the method.

BRIEF SUMMARY

There is a need for a less constraining and more effective method.

There is proposed a method for monitoring braking for a vehicle equipped with a regenerative braking means, for example an electric braking means, and a complementary braking means, for example a hydraulic braking means. The method comprises:

receiving at least one vehicle acceleration measurement value, this at least one measurement being performed during a braking transition during which the regenerative braking means and/or the complementary braking system apply a braking force to the vehicle, for each received acceleration value, receiving a torque value applied by the regenerative braking means and a complementary braking set point value intended for the complementary braking means corresponding to the instant of measurement of said acceleration value, estimating the coefficient of efficiency of the complementary braking means on the basis of this at least one received acceleration measurement value, of this at least one received torque value applied by the regenerative braking means, and of this at least one received complementary braking set point value.

Thus, by involving the torque applied by the regenerative braking means, for example a motive electric torque, and the complementary braking set point, this method allows for an estimation of the coefficient of efficiency of the complementary braking means at any instants of a braking transition. The acceleration measurement instant or instants can therefore be chosen independently of the speed of the vehicle. Furthermore, during this transition, the depression of the pedal by the driver can vary without this actually affecting the estimation, unlike in the prior art. This method is therefore advantageous in as much as it allows for the use of more measurement points than in the prior art.

Once the coefficient of efficiency is estimated, it is possible to provide a step of correction of the complementary braking set points values so as to take account of this efficiency, and therefore ensure better user comfort.

It is also possible to provide brake pad wear detection based on the estimated coefficient of efficiency, and the possible transmission of an alarm signal to signal that a replacement is necessary. This may allow for maintenance suited to the actual wear. Thus, "monitoring of the braking" can be understood to mean "control of the braking" but also "supervision of the braking".

The motive electric torque value can, for example, be measured.

Alternatively, this torque value can be estimated as equal to an electric braking set point value intended for the electric braking means. In other words, it is estimated that the efficiency of the electric braking means is 1 (or 100%).

According to another embodiment, it would be possible to provide for a coefficient of efficiency of the regenerative braking also to be estimated, for example by performing more acceleration measurements.

The electric and complementary braking set point values can be determined by a device for distributing a global braking control between the regenerative braking means and the complementary braking means. This distribution device receives as input a global braking control value, corresponding to a given pedal depression, and determines, from this control value and other parameters, such as, for example, the speed of the vehicle, a stability indicator signal, etc., a regenerative braking set point value and a complementary braking set point value. It is this distribution device which can control in particular a transition from all-electric to all-hydraulic between 14 and 7 km/h.

The estimation step described above may rely on an application of the fundamental principle of dynamics.

Advantageously and in a nonlimiting manner, provision can be made to receive at least one pair of two acceleration measurement values, and to calculate at least one acceleration variation value based respectively on this at least one pair of measurement values. The coefficient of efficiency can be estimated on the basis of this at least one variation of acceleration, of at least one variation of torque applied by the regenerative braking means, and of at least one complementary braking set point variation.

Advantageously and in a nonlimiting manner, for at least one pair of acceleration measurement values, the two measurement instants corresponding to this pair are relatively close together, that is to say sufficiently close together for the variation of the dynamic parameters external to the vehicle to be able to be disregarded.

The time between these two measurement instants can, for example, be less than 5 seconds, advantageously less than 2 seconds, advantageously less than 1 second, advantageously less than 0.5 second, advantageously greater than 0.0001 second.

This can thus make it possible to choose the measurement instants without taking into account any external dynamic parameters likely to have an influence on the acceleration of the vehicle, such as the force and the direction of the wind, the condition of the road, the road gradient, etc.

Advantageously and in a nonlimiting manner, provision can be made to receive a plurality of acceleration measurement values, a plurality of corresponding complementary braking set point values and a plurality of corresponding torque values applied by the regenerative braking means.

Advantageously and in a nonlimiting manner, it is possible to estimate a statistical value of the braking coefficient. This can make it possible to avoid the abrupt variations of the estimation linked to the implementation of a step of division by a very low value.

Alternatively, it would of course be possible to provide for determining each coefficient of efficiency value on the basis of a set of values (acceleration measurement, regenerative braking torque value, complementary braking set point value) corresponding to a given instant or to a pair of given instants. Since the values of the coefficient of efficiency obtained in this way are likely to vary over time, because of the error introduced by any external dynamic parameters and/or by any divisions by values close to zero, provision will be able to be made to filter and/or average these values.

Advantageously and in a nonlimiting manner, the estimation step can also be a function of physical parameters of the vehicle, for example the weight of the vehicle and the radius of the wheels of the vehicle.

Advantageously and in a nonlimiting manner, the method can comprise the reception of a plurality of pairs of acceleration measurement values, the estimation being performed as a function of this plurality of pairs of values.

Advantageously and in a nonlimiting manner, the estimation step may also be a function of at least one previous coefficient of efficiency value of the complementary braking means.

Advantageously and in a nonlimiting manner, the estimation step is performed according to a least squares method.

Advantageously and in a nonlimiting manner, the estimation step is performed according to a recursive least squares method.

Advantageously and in a nonlimiting manner, the estimation step is performed according to a recursive least squares method, with omission factor.

The omission factor can advantageously be variable, or adjustable. Provision can be made to adjust the omission factor according to the desired application. For example, to estimate wear of the brake pads, it can be possible to choose an omission factor corresponding to a relatively long time constant, of the order of ten or so days. To adapt the efficiency of the hydraulic actuator to the temperature and other conditions, a time constant of a few minutes will be able to be chosen.

Advantageously and in a nonlimiting manner, provision can be made to determine the values of the omission factor as a function of running time. The omission factor can be chosen to be low on startup, then increased progressively. This makes it possible to adapt the speed of convergence of the estimation.

Advantageously and in a nonlimiting manner, provision can be made to determine the values of the omission factor as a function also of other conditions likely to affect the efficiency of the complementary braking means: long period of non-use of the vehicle, change of temperature, change of pads, etc.

Advantageously and in a nonlimiting manner, the omission factor can be between 0.9 and 1, the value 1 being excluded.

The invention is in no way limited by this choice of a least squares method nor even is it limited by the choice of a statistical method.

In particular, provision can be made to implement the following steps:
measuring the global braking drag variation, between at least two successive instants, a variation established as a function of the variation of the friction braking torque, of the variation of the motive electric torque and of the dimensional physical and external dynamic parameters of the vehicle;
establishing, between said at least two successive instants, the woven variation brought about by the friction braking system, according to a linear function of the global braking woven variation, of the motive electric torque variation, and of the variation of the external dynamic parameters of said vehicle, and, the woven variation brought about by the friction braking system being established as the product of a friction braking torque set point value and of the coefficient of braking efficiency,
repeating during successive braking transitions, the preceding steps to calculate a statistical value of the braking coefficient.

There is also proposed a device for monitoring braking for a vehicle equipped with regenerative braking means, for example an electric braking means, and a complementary braking means, for example a hydraulic braking means. The device comprises:

means for receiving at least one vehicle acceleration measurement value, said at least one measurement being performed during a braking transition during which the regenerative braking means and/or the complementary braking system apply a braking force to the vehicle, means for receiving at least one torque value applied by the regenerative braking means and at least one complementary braking set point value intended for the complementary braking means, said at least one torque and set point value corresponding to the measurement instant of said at least one acceleration value, processing means for estimating the coefficient of efficiency of the complementary braking means on the basis of said at least one received acceleration measurement value, of said at least one received torque value applied by the regenerative braking means, and of said at least one received complementary braking set point value.

This device can be arranged in such a way as to be able to implement the method described above.

This device can, for example, comprise or be incorporated in a processor, for example a microcontroller, a microprocessor or even a DSP (digital signal processor).

The reception means can, for example, comprise an input port, a first processor, or similar, and the processing means can, for example, comprise a processor core, a second processor, or similar.

There is also proposed a braking control system comprising a device for a global braking control between the regenerative braking means and the complementary braking means, and a monitoring device as described above.

Also proposed is a vehicle comprising a regenerative braking means, a complementary braking means and a device and/or a system as described above.

BRIEF DESCRIPTION OF THE DRAWINGS

The method and the device that are objects of the invention will be better understood on reading the description and observing the drawings below in which, in addition to FIG. 1 discussed above.

DETAILED DESCRIPTION

Figure 2A:
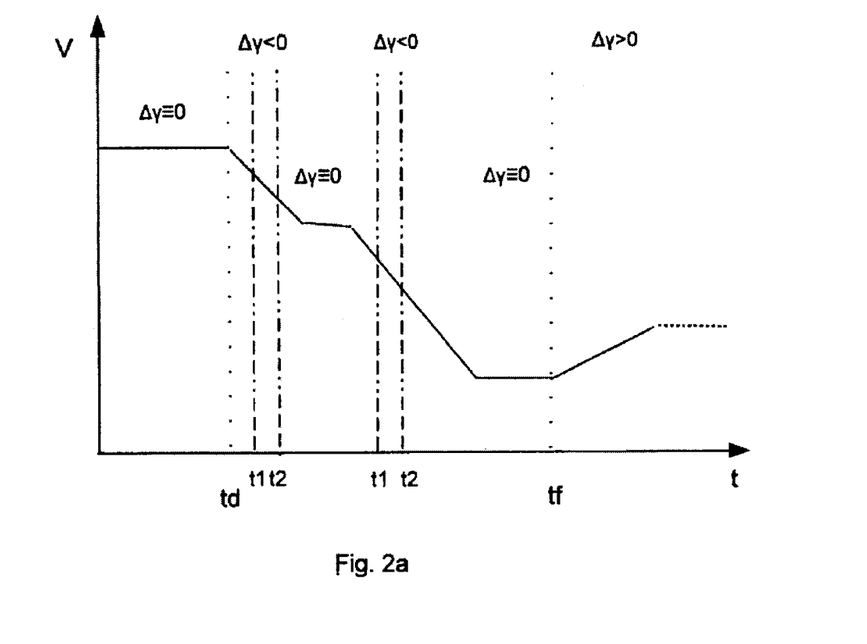
FIG. 2a represents, as an illustration, a representative time diagram of a vehicle braking transition or sequence.

In FIG. 2a, in the timing diagram of speed V of the vehicle as a function of time t, a motor vehicle is considered in which the driver executes, for example, a braking sequence, the vehicle in a first step running at a substantially constant speed, $\Delta\gamma=0$, then decelerating, $\Delta\gamma<0$, by control of the brake pedal, for example on entering a turn, followed by a short step at substantially constant speed, $\Delta\gamma=0$, then, upon suddenly encountering an obstacle, a new step of deceleration, $\Delta\gamma<0$, by control of the brake pedal, followed by a second step at substantially constant speed, $\Delta\gamma=0$, and then a new period of accelerations, $\Delta\gamma>0$, when the obstacle has disappeared after leaving the turn.

The vehicle is considered to be equipped with a friction braking system and an electrical energy recovery braking system, each of the abovementioned braking systems exerting, in each determined braking transition between the braking start td and braking end tf instants a given braking force.

In FIG. 2a, the braking sequence or transition is represented between the abovementioned braking start and end instants td and tf.

The global braking woven variation is measured between two successive instants t1 and t2, these instants being between the braking transition instants td and tf.

By applying the fundamental principle of dynamics to the abovementioned successive instants t1 and t2, this variation can be expressed as a function of the variation of the friction braking torque, of the variation of the motive electric torque and of the dimensional and dynamic physical parameters external to the vehicle.

The application of the fundamental principle of dynamics to the abovementioned two successive instants is expressed according to the relationship (1):

$$My(t1)=[Chv(t1)+Ce(t1)]/R+Fe(t1); \quad (a)$$

$$My(t2)=[Chv(t2)+Ce(t2)]/R+Fe(t2); \quad (b).$$

In the first equation (a) of this relationship, M designates the weight of the vehicle, y(t1) designates the instantaneous acceleration of the vehicle measured at the instant t1, Chv(t1) designates the true value of the hydraulic torque applied by the friction braking system to the vehicle at the instant t1, Ce(t1) designates the instantaneous value of the electric torque to the instant t1 exerted by the electrical energy recovery braking, R designates the radius of the wheels of the vehicle and Fe(t1) designates the external force applied to the vehicle at the abovementioned instant t1. The parameters M and R are dimensional physical parameters of the vehicle.

In the second equation (b) of the relationship (1), the same variables designate the same physical entities taken at the instant t2.

The global braking drag variation is established by the difference between the second (b) and the first (a) equation of the relationship (1). This variation is expressed according to the relationship (2):

$$M*AY=MY(t2)-MY(t1)=[(Chv(t2)-Chv(t2)+Ce(t2)-Ce(t1)]R+(Fe(t2)-Fe(t1))$$

In the relationship (2):

Chv(t2)−Chv(t1)=AChv=AChc*a designates the variation of the friction braking torque between the instants t1 and t2, this torque variation also being expressed as the product of the variation of the set point value of the braking hydraulic torque exerted by the friction braking system between the instants t1 and t2, denoted AChc, and the value of the coefficient of braking efficiency a estimated between at least two evaluation instants such as the instants t1 and t2.

The woven variation between the two successive instants t1 and t2 can therefore be expressed according to a linear function of the global braking woven variation, of the motive electric torque variation and of the variation of the dynamic parameters external to the vehicle.

The woven variation brought about by the friction braking system is established as the product of a friction braking torque set point value and of the coefficient of braking efficiency.

By choosing the successive instants t1 and t2 to be sufficiently close to one another, the variation of the forces external to the vehicle can be disregarded. In other words, the expression Fe(t2)−Fe(t1) can be disregarded, notably with respect to the hydraulic braking force.

This operation is expressed according to the relationship (3):

$$M*AY=[(Chv(t2)-Chv(t1)+Ce(t2)-Ce(t1)]/R+(Fe(t2)-Fe(t1))$$

In this situation, the linear function consists of the difference of the global braking woven variation and of the variation of the motive electric torque expressed according to the relationship (4):

$$M*AY=[(Chv(t2)-Chv(t1)+(Ce(t2)-Ce(t1)]/R+[(Fe(t2)-Fe(t1))=0], \text{ i.e., } AChc*a=RM*Ay-ACe.$$

In this relationship, the drag variation brought about by the friction braking system is expressed as the product of the variation of the set point value of the braking hydraulic torque exerted by the friction braking system between the instants t1 and t2, by the value of the coefficient of braking efficiency a.

Figure 2B:
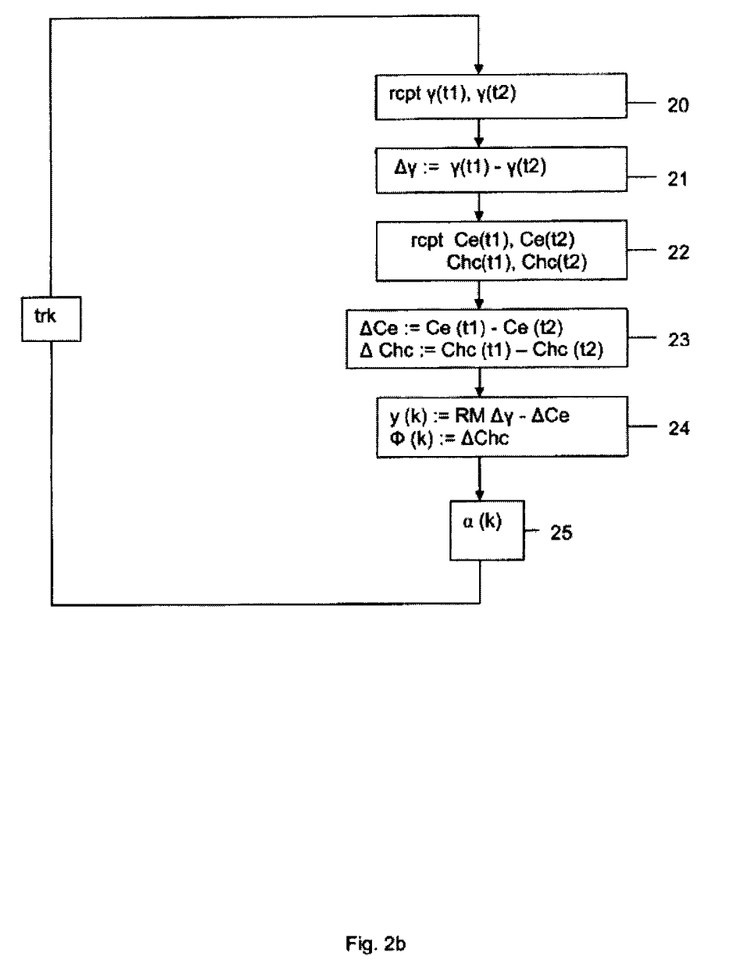
FIG. 2b represents, as an illustration, a flow diagram of an exemplary method according to an embodiment of the invention.

With reference to FIG. 2b, the acceleration values of the vehicle y(t1), y(t2) are received from an accelerometer in a step 20, then a difference between these values is calculated in a step 21.

Moreover, electric torque values Ce(t1), Ce(t2) are received in a step 22, together with the set point values of the hydraulic braking torque Chc(t1), Chc(t2). The differences between these respective values are calculated in a step 23.

Then, in a step 24, a value φ>(k)=AChc and a value y(k)=RM*AY−ACe are calculated.

The step 25 represents the estimation of the coefficient of efficiency a(k) of the hydraulic braking means, for example a hydraulic actuator.

A braking force optimization application can then consist in applying, for each braking transition, the statistical value of the braking coefficient a(k) estimated and/or updated over one or more earlier pairs of successive instants t1 and t2 during any subsequent braking transition to one or more subsequent pairs of successive instants t1, t2, as will be described in detail later in the description.

It is understood in particular, with reference to FIG. 2a, that the process can be repeated or not over one or more pairs of instants t1 and t2 and that the duly determined value of the braking efficiency can be stored and updated for application of the optimization of the value of the woven variation brought about by the friction braking system, the value of which is thus optimized with the difference of the global braking woven variation and of the variation of the motive electric torque.

In FIG. 2b, any repetition of the process previously described is represented by the return loop at the start of a time trk. The time trk is not determined and depends only on the journey of the motor vehicle, as represented in FIG. 2a.

The operation of optimization of the woven variation brought about by the friction braking system is executed substantially in real time, by virtue of the process of estimating and/or updating the coefficient of braking efficiency a during any movement of the vehicle.

The process of estimating and/or updating the coefficient of braking efficiency a will now be described in detail below.

As a general rule, it is indicated that the vehicle is advantageously equipped, in addition to the braking control system, with sensors for measuring the linear acceleration of the vehicle, all of these sensors being for example driven by a dedicated computer or by onboard computer of the vehicle. The corresponding equipment will be described in more detail later in the description.

It is understood that the concept of measurement and of calculation at the successive instants t1 and t2 is distinct from the concept of electronic sampling of the sensors. In a specific advantageous implementation, for a period of electronic sampling of the sensors, denoted Te, the time separating two successive instants t1 and t2 can advantageously be taken to be equal to a multiple of several electronic sampling periods Te. This makes it possible to satisfy the criteria of successive instants that are sufficiently close with respect to the dynamics of the vehicle and of each braking transition executed.

Furthermore, and in order to ensure a rapid convergence of the estimated and/or updated value of the coefficient of braking efficiency a, the estimation method executed is advantageously the recursive least squares method with variable omission factor, applied to the estimations and/or updates obtained for two of the successive estimations and/or updates. The omission factor makes it possible to weight the effect of the successive earlier estimations and/or updates.

The abovementioned estimation and/or updating method is noteworthy by the fact that it is thus possible to adapt the omission factor as a function of vehicle life phases, such as modifications or services of the hydraulic braking system by change of friction pads for example.

Thus, for each estimation, each executed for a pair of successive instants t1 and t2, the estimation and/or updating method advantageously consists in successively calculating the estimated value of the coefficient of braking efficiency a(k) according to the relationship (5):

$$a[k]=a[k-1]+L[k](y[k]-<[k]a[k-1])$$

$$L[k]=P[k-1]*ΦM/(λ+<i>[k]*P[k-1]Φ[k])$$

$$P[k]=(1-L[k]*<D[k])*P[k-1]/λ.$$

In this relationship, a[k] and a[k−1] designate the estimated and/or updated value of the coefficient of braking efficiency at the estimation instants of current rank k and prior rank k−1;

y(k)=RMAy-Ace designates, according to the relationship (4), the value of the product ACh*a at the estimation and/or updating instants of rank k, a(k) being the value of the coefficient of braking efficiency a(k) of rank k to be estimated and/or updated;

Φ>[k]=AChc designates the measured and calculated value of the hydraulic torque set point variation exerted by the friction braking system at the estimation and/or updating instants of rank k;

P[k−1] designates the covariance of the coefficient of braking efficiency a at the estimation instants of prior rank k−1;

L[k] is a specific function of the covariance P[k−1] of the coefficient of braking efficiency of prior rank k−1;

λ designates the omission factor.

The recursive least squares method with variable omission factor appears noteworthy in that the latter is simple to implement, requires no sophisticated computation means and does not require the storage of a lot of values in memory, in as much as the operations are performed for the successive values of prior rank k−1 and current rank k.

The initialization as a whole, and in particular of the recursive least squares computation algorithm, is also limited to the choice of three parameters:

the value a(0) of the coefficient of braking efficiency at the initialization instant t=0, i.e. for k=0;
the value of the omission factor λ;
the value of the initial covariance P(0).

In the estimation of a braking efficiency value, the estimated value is preferably filtered by means of a "rate limiter" type filter. The absolute value of the derivative of the signal is limited in order to avoid jerks.

The proposed estimation solution allows for rapid convergence towards a stable value of the coefficient of braking efficiency. If what is desired is simply to detect the variations of this coefficient due to the wear of the pads or to the seasonal temperature variation, the choice of the ramp, the slope given by the covariance P(k−1), depends mainly on the dynamics of the variations that are desired to be estimated. If, on the other hand, what is desired is to adapt the braking efficiency to the temperature conditions, a time constant or slope constant of a few minutes is chosen.

Figure 3:
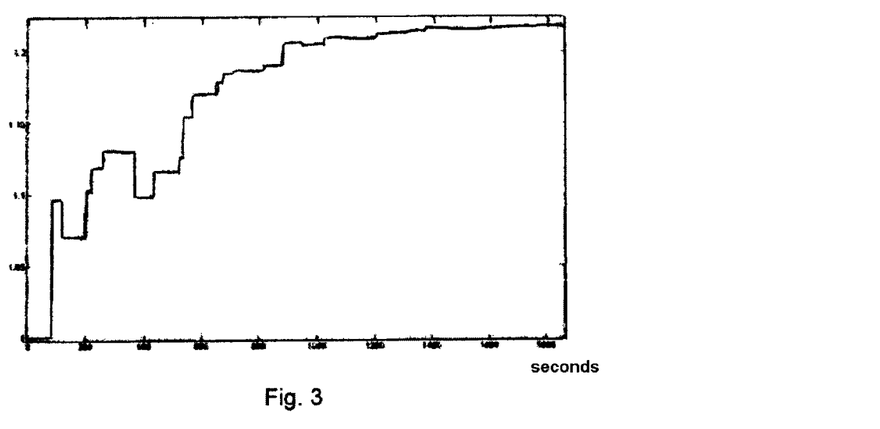
FIG. 3 represents, as an illustration, a time diagram of the trend of the braking efficiency estimated before specific filtering.

A result of estimation of a braking efficiency value a(k) is represented in FIG. 3, from a test executed in an urban environment on a town running site in the Paris region of Saint-Cloud over a duration of 4 hours.

In this figure the y axis is graduated by relative values of the coefficient of braking efficiency and the x axis by time in seconds.

In FIG. 3, the curve I represents the output of the estimator by recursive least squares with variable omission factor.

Thus, up to t=1000 seconds, the value of the omission factor is relatively low and the estimation converges rapidly, but with noise present. However, from t=1000 seconds, the omission factor increases and the estimation becomes less noisy and therefore more accurate.

With regard to the triggering of the process of estimation and/or updating of the coefficient of braking efficiency, for the pairs of successive instants t1 and t2, it is indicated that the conditions to be observed are preferably:
  time between the instants t1 and t2 less than a determined value, which can be a function of the instant linear speed of the vehicle; as described previously in the description, this time can advantageously be a multiple of the period of electronic sampling of the signals.
  detection of the existence of a negative longitudinal acceleration variation, $\Delta\gamma<0$, corresponding to a deceleration of the vehicle over this time. This makes it possible to avoid problems deriving from transient speeds and from nonlinearities.

This object method offers, with respect to the solutions of the prior art, the advantage of greater simplicity of an implementation in the absence of computation complexity, of division close to the value 0, of reduced cost in terms of memory space because the estimation process is executed by means of only two successive estimated values and of rapid initialization set up.

The method finally allows for a maximization of the recovered energy, in accordance with the expression of the relationship (4), because, for one and the same level of braking comfort, and therefore of use of the vehicle, there is a faster transition between the two actuators of the braking members.

Figure 4:
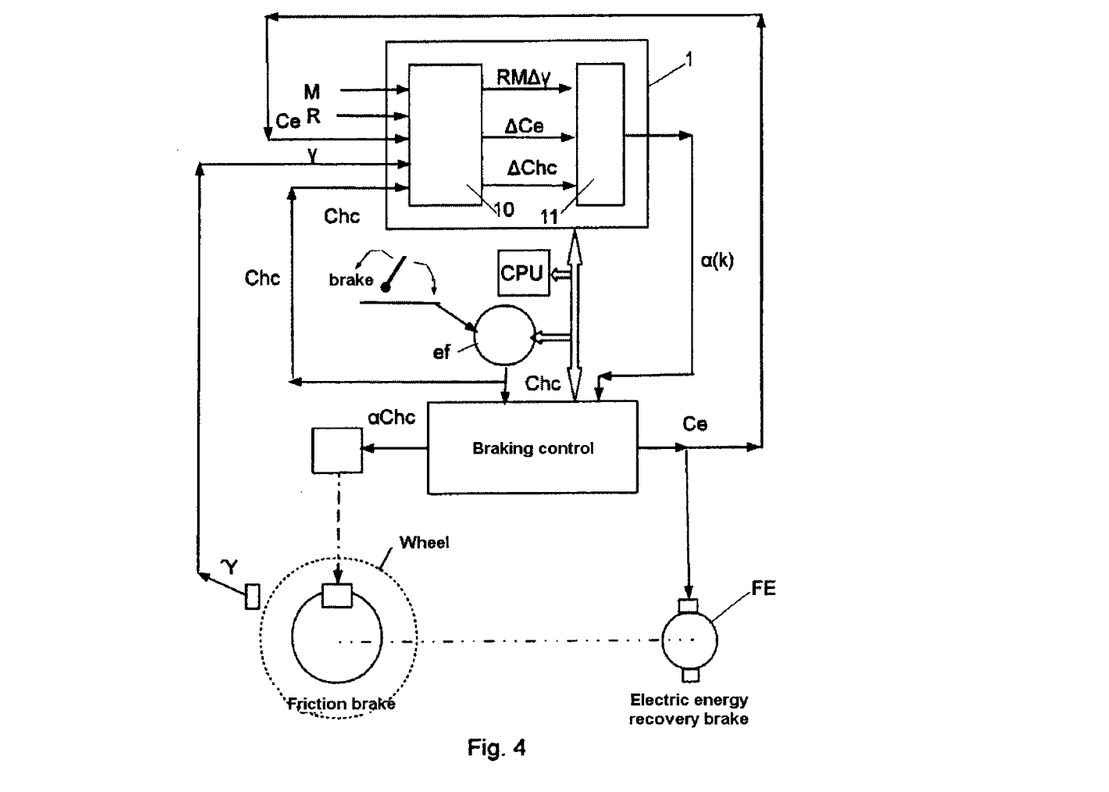
FIG. 4 represents a functional diagram of an exemplary device according to an embodiment of the invention.

A device for a vehicle equipped with a friction braking system and with an electric energy recovery braking system will now be described in conjunction with FIG. 4.

In the abovementioned figure, the device bears the reference 1. It is incorporated in the braking system of the vehicle, which is assumed to include a braking distribution device or control unit. This unit, designated "Braking control", drives both the friction brake schematically represented by a disc and a brake stirrup coupled to the wheel "Wheel" and an electric energy recovery brake, denoted FE, which is mechanically coupled to the wheel concerned. The abovementioned assembly is driven conventionally by the central computer of the vehicle or a dedicated computer, denoted CPU, which drives both the device that is the object of the invention 1, the "braking control", and the brake control effecter ef, represented by a rotary pedal in the abovementioned figure.

The device 1 comprises at least one means 10 for receiving the global braking woven variation between at least two successive instants t1, t2, for example a microcontroller.

This module 10 also receives the values of physical parameters of the vehicle, in particular the parameters of weight M and of radius of the wheels R. These parameters are a priori constant values, but can advantageously be adjusted.

The module 10 receives sampled values of instantaneous electric braking torque Ce and of linear acceleration γ of the vehicle. These quantities are supplied by suitable sensors, respectively by the braking control for example, and are sampled at the electronic sampling frequency controlled by the central processing unit CPU, and, of course, by the braking control unit.

From these input values, the module 10 delivers the global woven variation RMAy, the electric braking torque variation ACe and the hydraulic braking torque set point variation AChc.

Obviously, the abovementioned output values of the module 10 are calculated on the basis of the values electronically sampled or delivered by the dedicated computer CPU.

Furthermore, the device 1 that is the object of the invention comprises processing means, for example a module 11. This module 11 can, for example, comprise a DSP.

This module performs an estimation of the hydraulic braking coefficient.

This module 11 comprises an estimator of the friction braking efficiency with respect to the friction braking torque applied by the friction braking system for each estimation of rank k as a function of at least one braking efficiency value for an estimation of prior rank k−1.

The estimator used implements the recursive least squares method with variable omission factor applied at two successive evaluation instants in accordance with the estimation process, as described in the description in conjunction with the relationship (5) and represented in FIGS. 3a and 3b.

It delivers the estimated value a(k) of the braking efficiency, substantially in real time, to within the tolerance of the initialization phase, by virtue of the overall speed of computation convergence, to the braking control unit, which makes it possible to deliver the optimized control value AChc for controlling the friction brake.

The invention claimed is:

1. A method for monitoring braking for a vehicle including a regenerative brake and a complementary brake, comprising:
  receiving at least one vehicle acceleration measurement value from at least one measurement being performed during a braking transition during which the regenerative brake and the complementary brake apply a braking force to the vehicle;
  for each received acceleration value, receiving a torque value applied by the regenerative brake and a complementary braking set point value intended for the complementary brake corresponding to an instant of measurement of the acceleration value; and
  estimating a coefficient of efficiency of the complementary brake on the basis of the at least one received acceleration measurement value, of the at least one received torque value applied by the regenerative brake, and of the at least one received complementary braking set point value,
  wherein a plurality of acceleration measurement values, a plurality of torque values applied by the regenerative brake, and a plurality of complementary braking set point values are received, and wherein a statistical value of the coefficient of efficiency of the complementary brake is estimated according to a recursive least squares method with a variable omission factor.

2. The method as claimed in claim 1, further comprising:
receiving at least one pair of acceleration measurement values; and
calculating at least one value of variation of the acceleration based respectively on the at least one pair of measurement values,
wherein the estimating the coefficient of efficiency is performed on the basis of the calculated acceleration variation value, of at least one torque variation value applied by the regenerative brake, and of at least one complementary braking set point variation value intended for the complementary brake.

3. The method as claimed in claim 2, wherein, for the at least one pair of acceleration measurement values, the acceleration measurement values correspond to measurement instants separated by a time less than or equal to 1 second.

4. The method as claimed in claim 1, further comprising:
after the estimating, controlling the complementary brake based on the coefficient of efficiency.

5. A braking monitoring device for a vehicle including a regenerative braking means and a complementary braking means, comprising:
means for receiving at least one vehicle acceleration measurement value from at least one measurement being performed during a braking transition during which the regenerative braking means and the complementary braking system apply a braking force to the vehicle;
means for receiving at least one torque value applied by the regenerative braking means and at least one complementary braking set point value intended for the complementary braking means, the at least one torque and set point values corresponding to at least one measurement instant corresponding to the at least one acceleration value; and
processing means for estimating a coefficient of efficiency of the complementary braking means on the basis of the at least one received acceleration measurement value, of the at least one received torque value applied by the regenerative braking means, and of the at least one received complementary braking set point value,
wherein a plurality of acceleration measurement values, a plurality of torque values applied by the regenerative braking means, and a plurality of complementary braking set point values are received, and
wherein a statistical value of the coefficient of efficiency of the complementary braking means is estimated by the processing means according to a recursive least squares method with a variable omission factor.

6. A control system for a vehicle including a regenerative braking means and a complementary braking means, comprising:
a device for distributing a global braking control between the regenerative braking means and the complementary braking means; and
a monitoring device as claimed in claim 5.

7. A motor vehicle comprising a regenerative braking means, a complementary braking means, and a control system as claimed in claim 6.

8. A braking monitoring device for a vehicle including a regenerative brake and a complementary brake, comprising:
a microcontroller to receive at least one vehicle acceleration measurement value, at least one torque value applied by the regenerative brake, and at least one complementary braking set point value intended for the complementary brake, the at least one measurement being performed during a braking transition during which the regenerative brake and the complementary brake apply a braking force to the vehicle, and the at least one torque and set point values corresponding to at least one measurement instant corresponding to the at least one acceleration value; and
processing circuitry to estimate a coefficient of efficiency of the complementary brake on the basis of the at least one received acceleration measurement value, of the at least one received torque value applied by the regenerative brake, and of the at least one received complementary braking set point value,
wherein a plurality of acceleration measurement values, a plurality of torque values applied by the regenerative brake, and a plurality of complementary braking set point values are received, and
wherein a statistical value of the coefficient of efficiency of the complementary brake is estimated by the processing circuitry according to a recursive least squares method with a variable omission factor.

9. The braking monitoring device as claimed in claim 8, wherein the processing circuitry is a digital signal processor.

* * * * *